Dec. 24, 1957     T. D. BIRCHALL     2,817,438
METHOD AND APPARATUS FOR SORTING CANS AND THE LIKE
Filed April 6, 1953     4 Sheets-Sheet 1

INVENTOR.
THOMAS D. BIRCHALL
BY
ATTORNEY

Dec. 24, 1957 T. D. BIRCHALL 2,817,438
METHOD AND APPARATUS FOR SORTING CANS AND THE LIKE
Filed April 6, 1953 4 Sheets-Sheet 2

INVENTOR.
THOMAS D. BIRCHALL
BY
ATTORNEY

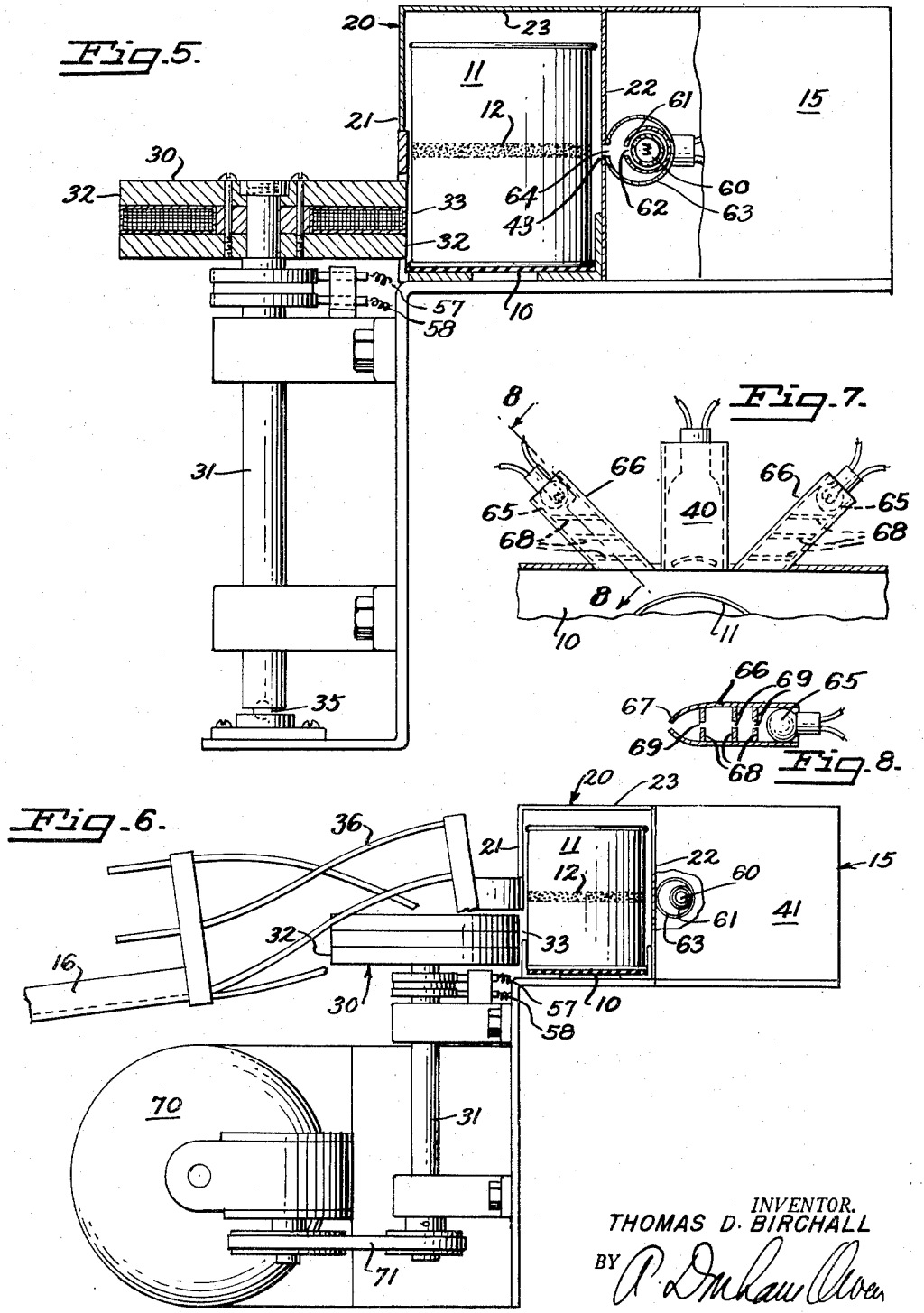

Dec. 24, 1957     T. D. BIRCHALL     2,817,438
METHOD AND APPARATUS FOR SORTING CANS AND THE LIKE
Filed April 6, 1953     4 Sheets-Sheet 4
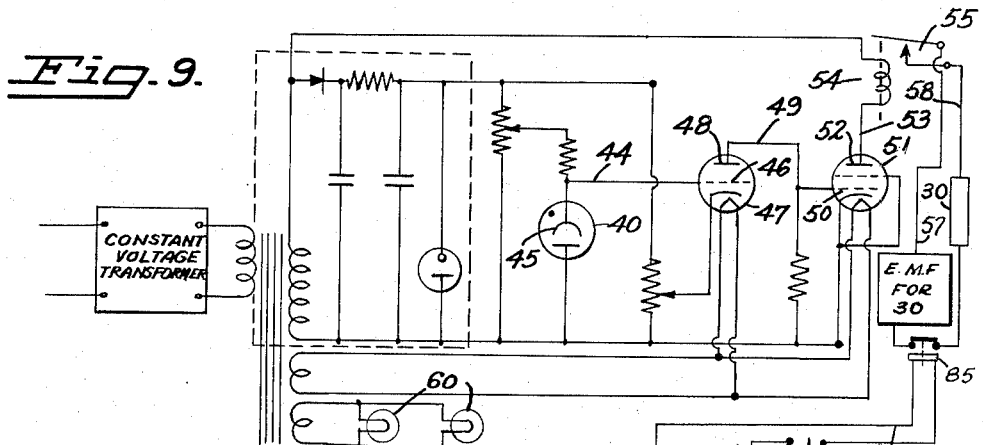
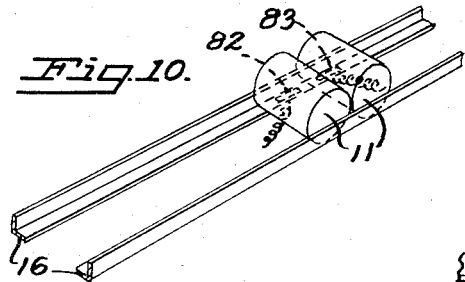
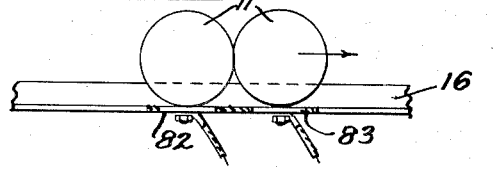
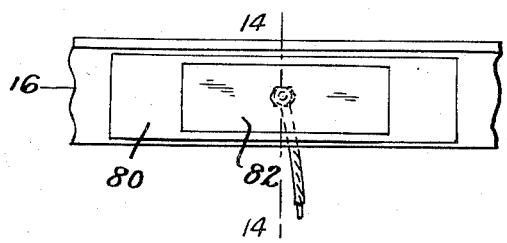
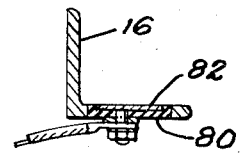
INVENTOR.
THOMAS D. BIRCHALL
BY
ATTORNEY

United States Patent Office 2,817,438
Patented Dec. 24, 1957

2,817,438

METHOD AND APPARATUS FOR SORTING CANS AND THE LIKE

Thomas D. Birchall, Turlock, Calif., assignor to G. W. Hume Company, Turlock, Calif., a corporation of California Application April 6, 1953, Serial No. 347,083

12 Claims. (Cl. 209—111)

This invention relates to a can-sorting device, preferably employing a photoelectric actuating means.

A costly bottleneck in the canning industry has resulted from the fact that when canning most products there are two or more different quality grades that have to be processed simultaneously. For example, "A," "B," and "C" grades of peaches all are brought to the cannery at the same day, sometimes even being mixed together in the same or succeeding lugs. These different grades of peaches may all be cut, sliced, sorted, and placed in respective cans at substantially the same time, by the same or by different groups of people, and the cans marked with the grade indication, and this is normally done. But the bottleneck has come at the cooking operation, where the grades have had to be cooked in separate batches. The economical way to operate the continuous cookers used in canneries, is to keep them supplied with a continuous flow of cans. However, the problem of sorting the cans after cooking has heretofore kept canners from sending more than one grade through the cooker at a time, even though all grades were to receive identical cooking. Full capacity of the continuous cooker was not realized and the cannery output was delayed while the cans containing one quality grade were held up until the cans containing a different quality had come out of the cooker.

Basically, the problem has been that of devising a means for inexpensively, quickly, and accurately sorting the cans. Hand sorting is too slow and too expensive, and up to now mechanical sorting has been too inaccurate and too slow to be practical.

The present invention has solved this sorting problem by having a photoelectric cell make the selection which actuates a rotatable wheel-electromagnet, adjacent one side of the can conveyor line to pull every selected can off the line onto a branch conveyor. It permits unselected cans to pass. The device is accurate and swift, so that there is no longer need to have gaps in the conveyor line in the continuous cooker.

The success of the device is attributable to a novel form of device for pulling the selected cans from the conveyor and to other features. The selecting is done by a photoelectric cell on the basis of whether the wall on the passing can is reflective of light or whether it has been treated so as not to reflect light onto the cell. One way of rendering a can wall non-reflective of light is to paint or print a dark band around the can at the same height as the photoelectric cell. All cans so marked will be used in canning a particular grade of product. A different grade of product may be indicated by leaving the can body blank. A still different grade of product may be indicated by placing a dark band at a different height on the can wall to correspond with a photoelectric cell at a desired sorting station. At each sorting station the can line may be divided into two lines until all the cans have been sorted.

The sorting at each station is effected by a rotatable electromagnet which is energized whenever a can is in position which it is desired to sort out of the line of cans. This magnet pulls the can against it and holds it until it has been pulled off the conveyor and the can drops into a branch conveyor line.

In addition to the general features of novelty just discussed, the invention includes other novel features such as the protection of the photoelectric cell from stray light by a housing arrangement, the use of slits of light on both sides of the photoelectric cell to assure sharp discrimination and a wide area of operation, means for providing a sharp slit of light responsive to a relatively narrow marking band, and a cut-off switch that prevents cans from accumulating beyond the capacity of any branch conveyor so the cans cannot back up into the main can conveyor line.

From this it will be seen that the following objects of the invention are achieved: to provide a novel means for removing certain cans from a passing line of cans; to provide a high-speed and accurate can-sorting device; to provide a sorter responsive to annular markings at different heights around the can; to provide a foolproof sorting device not requiring the constant attention of a skilled operator, or indeed of any operator; and to provide a simply binary photoelectric-controlled discriminator for separating individual objects on a conveyor into two groups.

Still other objects and advantages of the invention will appear from the following description of preferred embodiments thereof, presented in accordance with U. S. Revised Statutes, Section 4888. The device, however, is not intended to be limited to the illustrative details because in many instances there are equivalent structures which would also come within the spirit of the invention and the range of the claims.

In the drawings:

Fig. 5 is a view in elevation and in section taken along the line 5—5 of Fig. 3.

Fig. 6 is a view in elevation looking at Fig. 3 from the right-hand side, and showing a modified form of the rotating magnet, in which separate power is provided for positively driving or rotating the magnet.

Fig. 7 is a top plan view of a modified form of the invention in which the slit light sources are produced by a series of baffles.

Fig. 8 is a view in elevation and in section of one of these light sources and its series of baffles, taken along the line 8—8 in Fig. 7.

Fig. 9 is an electrical circuit diagram of the device shown in Figs. 1 through 5.

Fig. 10 is a fragmentary view in perspective of a portion of the side conveyor track, showing a novel cut-off switch, with two cans thereon.

Fig. 11 is a view in side elevation and partly in section of the cut-off switch and two cans thereon in actuating position.

Fig. 12 is a view similar to Fig. 11 with the cans in a non-actuating position.

Fig. 13 is an enlarged top-plan view of one of the contactor elements.

Fig. 14 is a view in section taken along the line 14—14 in Fig. 13.

Figure 1:
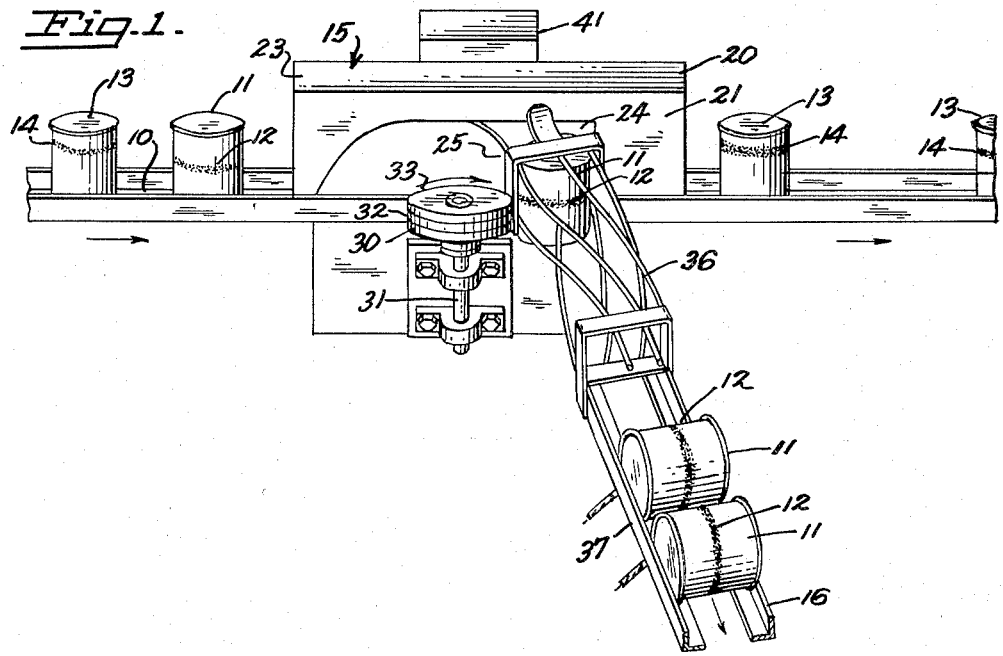
Fig. 1 is a view in perspective of a segment of a can conveyor showing a sorting station embodying the principles of the present invention. The supporting framework has been omitted because it is no part of the invention, because it is well-known, and because its inclusion would tend to confuse the portions of the drawing showing the actual invention.
Figure 2:
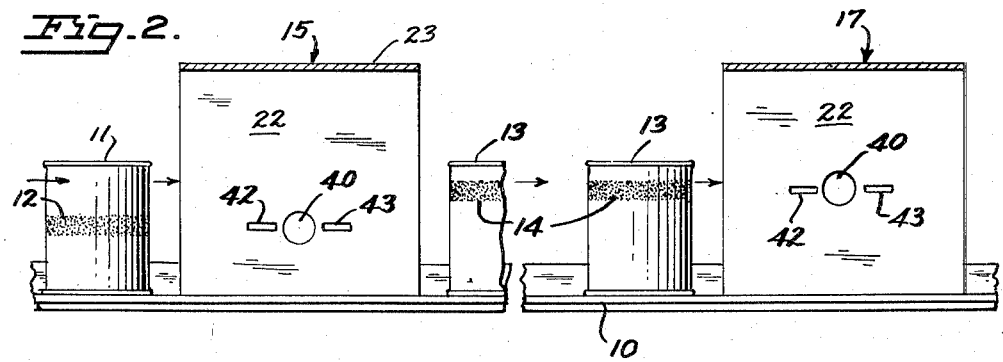
Fig. 2 is a view in elevation showing the can conveyor of Fig. 1 and two successive sorting stations embodying the principles of the invention, together with cans to be sorted at these stations. The view is somewhat diagrammatic and has been broken at the middle in order to conserve space.
Figure 3:
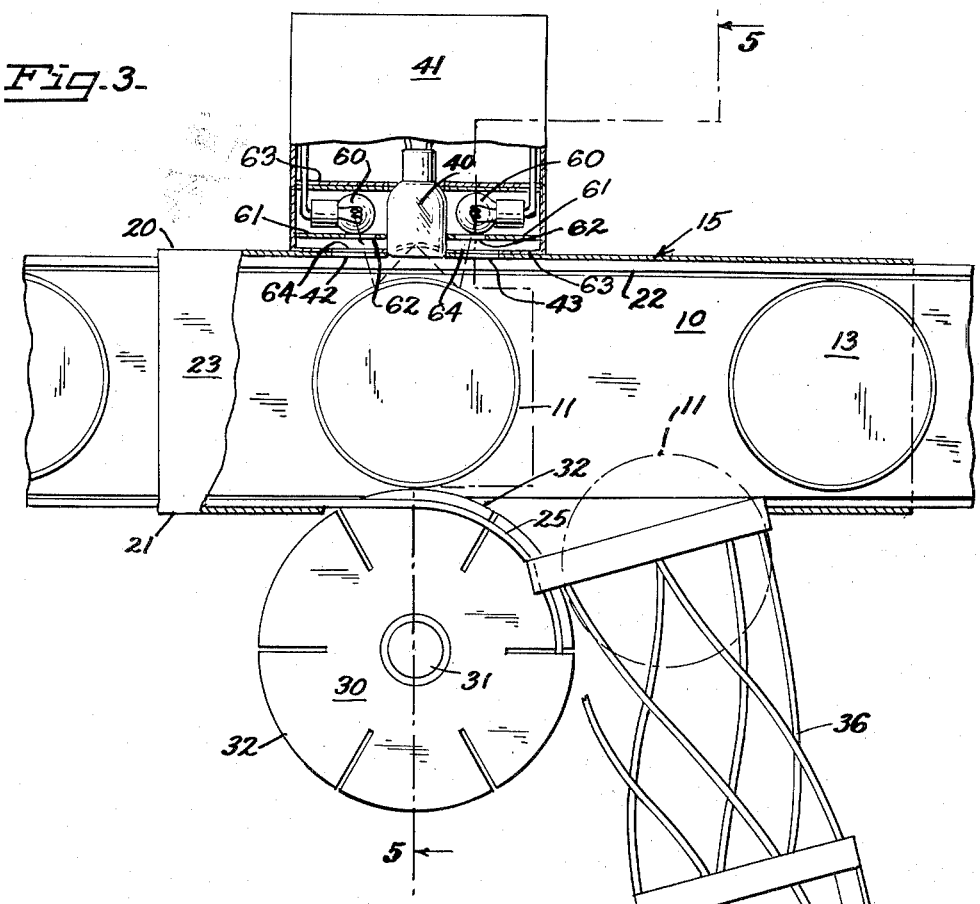
Fig. 3 is a top plan view, somewhat enlarged, of the sorting station of Fig. 1, a portion of the tunnel and the light housing being broken away and shown in section.

Figs. 1–3 show a conveyor 10 moving a series of cans in upright position. Some cans 11 are encircled by a dark, non-reflective band 12 at about their center, other cans 13 have a similar band 14 at a higher level, and a third series of cans have no marking on their walls. The bands 12 and 14 and the unmarked cans are indicia of quality grades or of other characteristics of the contents of the cans which require sorting. The many combinations of marking bands makes it possible to sort out any number of cans from each other. In this description only plain cans and cans 11 and 13, each with its own characteristic marking, will be referred to for purposes of illustrating the principles of the invention. To separate these three sets of cans will require two sorting stations.

At a first can sorting station 15 the marked cans 11 are separated from the unmarked cans and the cans 13 and are moved onto a side conveyor 16, while the unmarked cans and the cans 13 continue moving along on the conveyor 10. The unmarked cans and the cans 13 are conveyed to another sorting station 17 (Fig. 2) identical to the station 15 except that the height of the photoelectric cell and of the slit-light sources is different and conforms to the band 14.

Both can sorting stations 15, 17 include a housing 20 whose side walls 21, 22 and top wall 23 have dark, non-reflecting inside surfaces and extend for enough distance along the can conveyor 10 to prevent stray light from other parts of the cannery from accidentally actuating the photoelectric apparatus. Where the side conveyor or track 16 branches off from the main conveyor 10, the housing 20 has a side opening 24 and a curved flap 25 with a dead black inner surface extending out from the side wall 21 to exclude stray light at this point.

Adjacent the side track 16, an electromagnet 30 preferably in the shape of a wheel is mounted on the upper end of a vertical shaft 31 in a generally horizontal position. The shaft and wheel rotate freely. An arcuate portion of the wheel's periphery 32 extends into the housing 20 through an opening 33. The wheel 30 is magnetized only when current passes through its coils, and the core may be divided by slots 34 to prevent overheating.

When the wheel magnet 30 is not magnetized, the cans will be carried past it by the conveyor 10 and will not be pulled off onto the side track 16. When, however, the wheel 30 is magnetized, its strong magnetic attraction for the steel in the can pulls the can into direct contact with the wheel's outer periphery 32. For example, at station 15 as the can 11 is moving along the conveyor 10 it is pulled against the wheel 30, and since the wheel 30 is freely rotatable, preferably being mounted on a ball-bearing 35 (Fig. 5), the impetus of the conveyor 10 on the can will cause the can 11 to rotate the wheel 30 thereby carrying the can 11 off the conveyor 10 along an arcuate path toward the side track 16, corresponding to the wheel's periphery 32. The magnetized wheel 30 actually pulls the marked can 11 off the conveyor 10 and onto the side track 16. There is a gravity slide and a 90° turn arrangement 36 may be used to separate the can 11 from the magnet 30 by gravity, by the path limitation, and by enabling the centrifugal force present to overcome the pull of the magnet. The can 11 then rolls by gravity along the side track or conveyor 16.

Should the side track or conveyor 16 become clogged with cans, the cans could back up onto the conveyor 10 and interfere with the main line of cans. To prevent this, a cut-off switch 37 is provided at the upper end of the side track 16 just below the turning device 36. This switch 37 is composed of two sides of an electrical circuit 84 built into the side track 16 but insulated from it by the insulators 80, 81. (See Figs. 9–14.) The two contactors 82, 83 are so placed as to be separated by the exact distance of one can. When two cans come to rest adjacent each other and touching each other, one in contact with the contactor 82 on one side of the electrical circuit 84 and the other one in contact with the other contactor 83 on the other side of the electrical circuit, the circuit is completed. Current then flows actuating a relay 85, opening the magnetizing circuit so all the cans will pass along the conveyor 10. Although this opening of the switch 37 temporarily disconnects the sorting at station 15, it is preferable to having the cans back up to where they plug the main conveyor 10, because the conveyor 10 normally comes directly out of a continuous cooker (not shown) and that line must not be blocked. In practice, it is quite a simple matter to sort by hand the few cans that pass in the short interval that elapses before the side track 16 is cleared and the cut-off switch 37 is closed.

The magnetization of the wheel 30 is controlled by a photoelectric cell 40 mounted in a housing 41 on the opposite side 22 of the main housing 20 from the wheel 30. The cell is positioned as shown in Fig. 2 in between two extended narrow slits 42 and 43 both of which act as light sources for narrow slits of light. For purposes of illustration, the circuit is set up so that when the can reflects light back into the photoelectric cell 40, it energizes the cell and cuts off the electric current to the electromagnetic wheel 30. This allows the can to continue on the main conveyor 10. The current to the wheel 30 remains off so long as light is reflected back into the photoelectric cell 40. When light is no longer so reflected, the cell 40 is de-energized and the electromagnet circuit is energized.

An unmarked can or a can having a band mark at any other height than the height of the slits 42, 43 and the height of the photoelectric cell 40, will reflect back light from its shiny sides into the cell 40 thereby energizing the cell 40 causing de-energization of the magnet 30, and the can will not be pulled off into the side track 16. However, when a can 11 having a dark band 12 around its circumference reaches station 15 where the slits 42, 43 and the cell 40 are at the same elevation as that of the band 12, not enough light will be reflected to energize the photoelectric cell. This will leave the magnet 30 energized and the magnet will pull the can 11 off the conveyor 10 and carry it into the side track 16.

One illustrative circuit by which the photoelectric cell 40 will be made to control the magnet 30 is shown in Fig. 9. A wire 44 connects the cathode 45 of the photoelectric cell to the grid 46 of the vacuum tube 47. The plate 48 of the tube 47 is connected by a wire 49 to the grid 50 of a thyratron tube 51 whose plate 52 is connected by a wire 53 to a relay 54 controlling a switch 55. A source of direct current electric power is connected to the magnet 30 by wires 57 and 58 and the switch 55, which will open whenever and for as long as the photoelectric cell 40 is actuated.

In order for the invention to have the maximum efficiency, it is necessary that the light sources be narrow slits so that the marking bands 12 or 14 may be relatively narrow and so that no light will be reflected back from portions of the can above or below any marking band. It is also necessary that cans not to be separated out at a particular station reflect light into the photoelectric cell 40 over a long enough path to carry them beyond the field of the electromagnet 30 before it is re-energized.

Slit sources of light are used instead of point sources because, since the can surface is cylindrical, a point of light would be reflected back to another point (i. e., the photoelectric cell 40) for only a brief instant of time and this would not be long enough to permit a can not marked for separation at that station to pass the magnet 30. With such a point source of light, the magnet 30 would be demagnetized only for an instant and when remagnetized, it might pull the can off the conveyor 10. Similarly, if too wide a source of light were used, the bright body of the can, not being a perfect cylinder nor a perfect mirror, would tend to reflect and scatter enough of the light so that even a can 11 which was marked with the dark band 12 might reflect enough light into the photoelectric cell 40 to demagnetize the magnet 30, and there would be no satisfactory sorting operation at the station 15.

Figure 4:
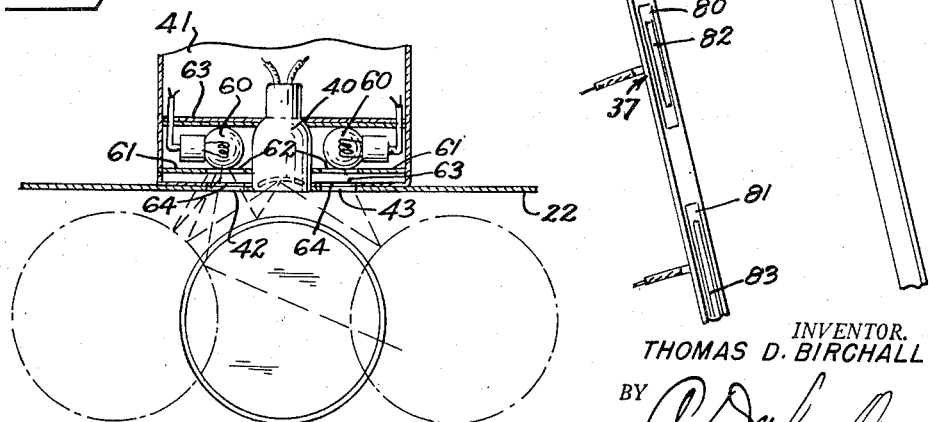
Fig. 4 is a view of a portion of Fig. 3 showing some of the paths of light that go from the light sources to a passing can and are reflected back into the photoelectric cell.

The present invention shows two forms of slit sources which may be used behind the slots 42, 43 in the housing. The form of light source shown in Figs. 3, 4, and 5 is duplicated on each side of the cell 40. Each includes a light bulb 60 housed inside a fixed metal tube 61 having a narrow slit 62 through its wall. The tube 61 may then be contained in a larger tube 63 tangent to the tube 61. A slit 64 through the wall of the tube 63 lies about 180° from the point of tangency, parallel to the slit 62, and adjacent to the light slit 42 or 43. By this means the light from the bulb 60 is kept from diffusing widely and emanates from the slit 42 or 43 as a narrow fine line.

A modified form of a slit lighting arrangement is shown in Figs. 7 and 8. Here each light source 65 is contained in a tube 66 alongside and inclined at about 45° to the cell 40 and having a flattened outer end 67 which takes the place of the slit 42 or 43 and performs its function. A series of baffles 68 each having the slit 69 through them lies inside the tube and assures the emanation of a narrow slit of light.

The length of the slits 42 and 43 of light should be sufficient so that a can not marked for separation at that station will reflect light back into the photoelectric cell 40 over a relatively long path. In this way the can will get completely beyond the magnet 30 and its effective magnetic field before the cell 40 is de-energized and the magnet 30 is re-energized.

Fig. 4 shows diagrammatically some of the light paths which strike the can when in different positions and which are reflected back into the photoelectric cell 40. It will be seen from this view that the combination of the two sets of slits 42, 43 with the photocell 40 is ideal for cylindrical cans.

As Fig. 2 shows, the apparatus may be made subject to a marking at a given height by setting the slits 42, 43 and the cell 40 at the chosen height. In this manner the second station 17 acts to sort cans 13 having a marking 14 at a different height from the marking 12 on the cans 11. At station 17 the unmarked cans continue on on the conveyor 10. Any desired number of such markings may be used depending only upon the number of stations that are provided and upon the height of the can and the width of the marking band. If desired a can may be marked with more than one band for two different sorting operations so that a considerable number of combinations may be achieved. In each instance, however, the essential operation comprises passing the line of cans past a slit opening so that reflection or non-reflection from the can surface will effect de-energization or energization respectively of a rotatable electromagnet either to allow the can to pass the rotatable magnet on the conveyor or to seize the can and carry it off the conveyor line.

The modification shown in Fig. 6 differs from the form of the invention described herein only as respects the rotatable magnet 30. Here the magnet 30 is power-driven by a motor 70 through a belt 71. The motor preferably rotates the wheel 30 at all times, whether the wheel 30 is magnetized or demagnetized. If a power-rotated wheel 30 is used, the preferable speed of rotation of the periphery of the wheel should be somewhat faster than that of the can conveyor. The purpose of this is to pull the cans off the conveyor quickly so that no clogging can occur. However, for most uses, it is not necessary to have positive rotation of the magnet, because the speed of the can conveyor, the spacing of the cans thereon, and the weight of the contents in the cans provide sufficient inertia to rotate the ball-bearing mounted wheel 30 and to knock the can loose from the wheel. Power-rotation of wheel 30 would normally be preferable where the contents of the cans are relatively light in weight.

Operation of the device is as follows: Cans 11, each with a non-reflective marking band 12 at the height of the light slits 42, 43 at the station 15, and cans 13 with a non-reflective marking band 14 at the height of the slits 42, 43 at the station 17 and cans without any marking band are moved in any order along the conveyor 10. They come first to the sorting station 15 where they enter the housing 20 and pass in front of the slit 42 where the light shines against the side wall of the cans. Those with a dark band 12 at the height of the slits do not energize the photoelectric cell 40 because not enough light is reflected into it. This leaves the magnet 30 magnetized by its electric circuit so it will seize the can 11, hold it against its periphery 32 while the momentum of the can 11 and the rotation of the wheel 30 pull the can 11 off the conveyor 10 onto the side conveyor 16. A can 13 without a dark band at the height of the slits at station 15 and the unmarked can will, however, reflect light from the slit 42 into the photoelectric cell 40, so that the magnet circuit is demagnetized before either of these cans reaches the field of the wheel 30. The magnet 30 remains demagnetized until either of these cans has passed beyond its effective field, because the slit 43 also reflects light to energize the cell 40. The unmarked can and the marked can 13 continues on along the conveyor 10. Since the can 13 has its dark band 14 at the height of the light slits in the station 17, it will not energize the cell 40 which will leave the wheel 30 magnetized and the can 13 will be pulled off the conveyor 10. The unmarked can will reflect light to energize the cell 40 which will de-energize the magnet 30 so this can will pass on along the conveyor 10.

The preferred arrangement is to have the magnetizing circuit for the magnet pull-off wheel 30 so that it is magnetized when a can with a dark strip is in the range of the cell 40 and slits 42, 43. This means that a can so marked will be pulled off the conveyor 10 by the wheel 30. The above arrangement makes it easy for the set-up man in the cannery to make his installation for he knows that wherever he wants to separate out a certain pack, all he must do is to measure the height of the slits and cell 40 in the housing located at the separating point, and then arrange a banding machine to paint or otherwise render the can wall non-reflective for a strip 12 wide enough to prevent light from being reflected onto the cell 40 as the can is brought along on the conveyor 10. The set-up man can arrange for as many different sorting points as he has housings with the slits and the cell 40 at different heights. If he exhausts these then he can go to combinations where two or more cells 40 will be placed at different heights in the housings. It would be the exceptional installations however that would require this last expedient.

While the invention has been described with the photoelectric cell 40 arranged to de-energize the magnet 30 when the cell 40 is energized, this may be reversed. In the latter case the cans with the dark band at the height of the light slits will be allowed to pass along the conveyor 10, whereas those which direct a source of light at the cell 40 will thereby energize the magnet 30 and be pulled off the conveyor 10.

It will be evident that this invention provides an effective means for positively sorting out marked cans. The motion of the wheel magnet 30 is smooth, there are no angular surfaces which could damage the cans, and no reliance is made upon such relatively complicated devices as solenoids and trap doors.

One important feature of novelty is the wheel mounted magnet to pull the cans off the conveyor to effect the sorting.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

What is claimed is:

1. A can sorting device for sorting from a conveyor line cans having a dark band at a predetermined height around their outer periphery from cans not so marked including in combination an electromagnet comprising a rotatable means mounted for rotation in a generally horizontal plane beside the can conveyor to pull a can off said conveyor when magnetized; a magnetizing circuit for said means, including a photoelectric cell which controls the magnetization and demagnetization of the electromagnet according to whether a predetermined quantity of light is or is not directed at said photoelectric cell; and means for directing light from the surface of a passing can, whereby a can without a dark band opposite said cell will reflect light into said cell and energize it, and a can with a dark band opposite said cell will not reflect sufficient light into said photoelectric cell to energize it, whereby said cans with different markings will be separated from each other.

2. The device of claim 1 in which the rotatable means is power-rotated.

3. The device of claim 1 in which the rotatable means is mounted for free rotation.

4. A can sorting device for sorting from a conveyor cans some of which have a dark band at a predetermined height around their outer periphery and others which have no such band including in combination a rotatable wheel-like electromagnet mounted beside the can conveyor for rotation about a vertical axis to pull a can off the conveyor when the electromagnet is energized; an electric circuit with a photoelectric cell controlling the magnetization and demagnetization of said electromagnet according to whether a predetermined quantity of light is directed into said photoelectric cell from a can wall; and a pair of slit light sources on each side of said photoelectric cell for directing light at said cell whereby a can passing thereby on said conveyor without a dark band at the height of said slits will reflect said light into said cell and energize it, and a can with a dark band at the height of said slits will not reflect sufficient light into said photoelectric cell to energize it; whereby in one case one can will stay on the conveyor and in the other the electromagnet will pull the can off said conveyor.

5. The device of claim 4 in which said slit sources comprise a pair of tangent cylinders, one inside the other, with a light globe inside the inner cylinder and with aligned slits through said cylinders about 180° from the point of tangency.

6. The device of claim 4 in which said slit sources of light comprise two housings inclined at about 45° alongside said photoelectric cell on each side thereof and converging toward it, light globes in said housings, baffles with aligned slits in said housing, and a slit through said housing adjacent said cell and lying in a plane perpendicular thereto.

7. A can sorting device including in combination a conveyor means; a side track leading off from said conveyor; a housing substantially enclosing said conveyor in the vicinity of said side track; a rotatable wheel electromagnet horizontally mounted adjacent the juncture of said side track and said conveyor and on the same side of said conveyor as said side track; and an electric control device for controlling the energization and de-energization of said electromagnet, said device being located on the opposite side of said housing and conveyor from said electromagnet, said control device including a photoelectric cell positioned in an opening through said housing and responsive when light is reflected therein to control said electromagnet and to control said electromagnet oppositely when no light hits said cell, and a slit source of light in said housing on both sides of said photoelectric cell.

8. A can sorting device including in combination a main conveyor belt; a side conveyor leading off from one side of said conveyor; walls with dark interior surfaces to provide a dark housing over and on each side of said conveyor adjacent said side conveyor; a wheel electromagnet rotatably mounted on a vertical axis adjacent the juncture of said conveyors on the same side of said main conveyor as said side conveyor and upstream therefrom; a photoelectric cell positioned in an opening through the wall of said dark housing on the opposite side of said housing and said conveyor from said electromagnet, and responsive when light is reflected therein to de-energize said electromagnet and at other times to permit said electromagnet to be energized; and a pair of slit sources of light shining through said walls, one on each side of said photoelectric cell and at the same height.

9. The device of claim 8 in which there is switch means on said side conveyor and in series with said electromagnet whereby when the cans back up on said side conveyor to a predetermined point they actuate said switch means and thereby de-energize said electromagnet.

10. In a can separating device the combination of a conveyor along which said cans are propelled, a pivoted magnetizable member adjacent said conveyor, means to energize said member when it is desired to pull a can off said conveyor, whereby a can adjacent said member will be pulled against it and pulled off said conveyor, a side conveyor into which said cans are discharged from said member, and switch means on said side conveyor in series with said magnetizable member and its energizing means, whereby when the cans back up on said side conveyor to a predetermined point, they actuate said switch means and thereby de-energize said magnetizable member.

11. The device of claim 10 in which said switch means comprises a relay controlled by a normally open circuit, which, when closed, serves to break the circuit to said magnetizable member, said normally open circuit including a pair of electrical contact means on said side conveyor and insulated therefrom, lying in the paths of cans rolling over said side conveyor, so that said contact means are electrically connected when a can rests on each of them and said cans are in contact with each other.

12. The device of claim 11 in which the length of each said contact means is approximately the diameter of the cans being processed and in which said contact means are spaced apart a distance less than the said diameter.

References Cited in the file of this patent

UNITED STATES PATENTS

| | | |
|---|---|---|
| 1,812,294 | Hohn | June 30, 1931 |
| 1,834,905 | Sheldon | Dec. 1, 1931 |
| 2,264,348 | Weygant | Dec. 2, 1941 |
| 2,640,590 | McClelland | June 2, 1953 |
| 2,657,799 | Johnson et al. | Nov. 3, 1953 |
| 2,700,465 | Pechy et al. | Jan. 25, 1955 |